UNITED STATES PATENT OFFICE.

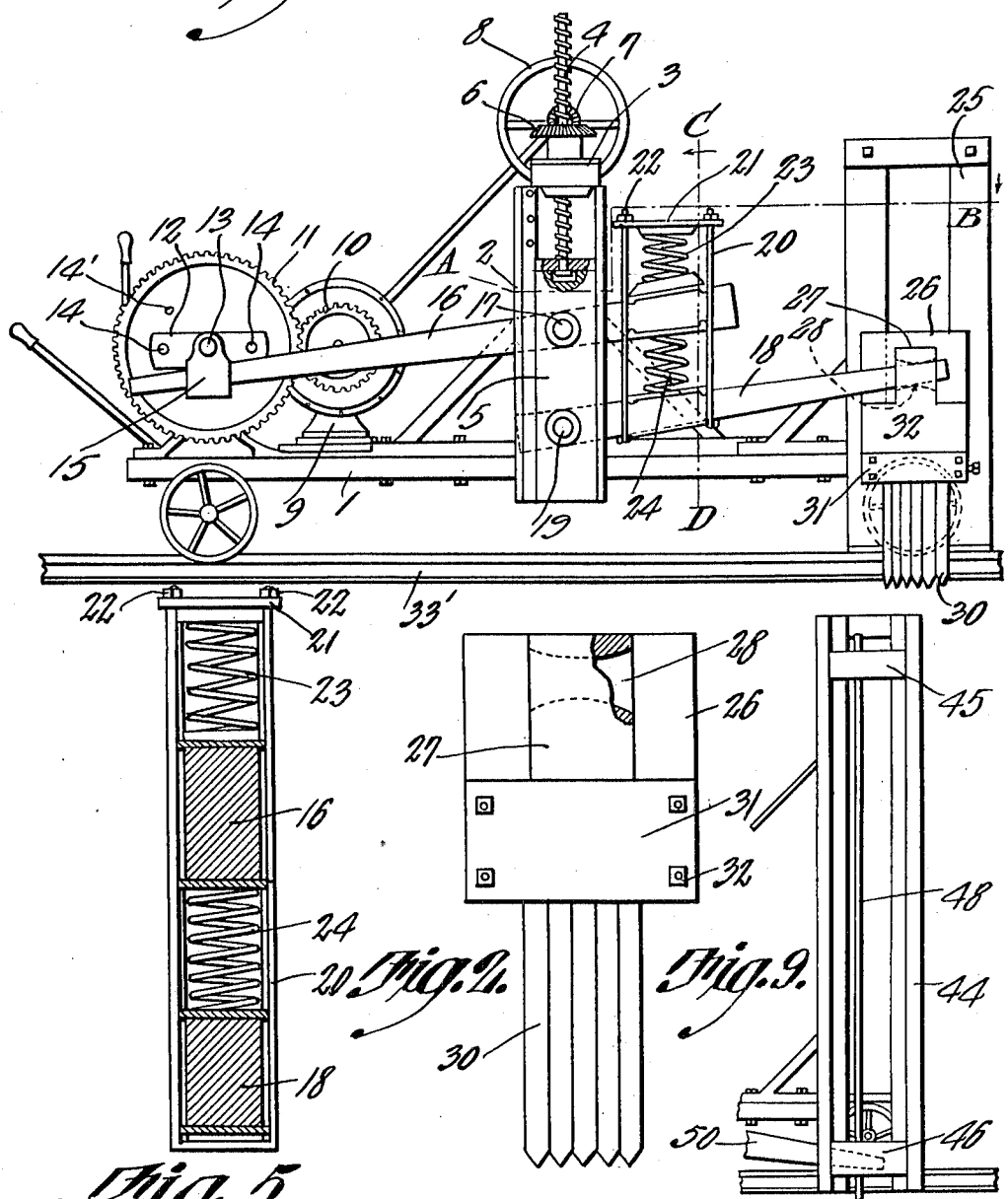

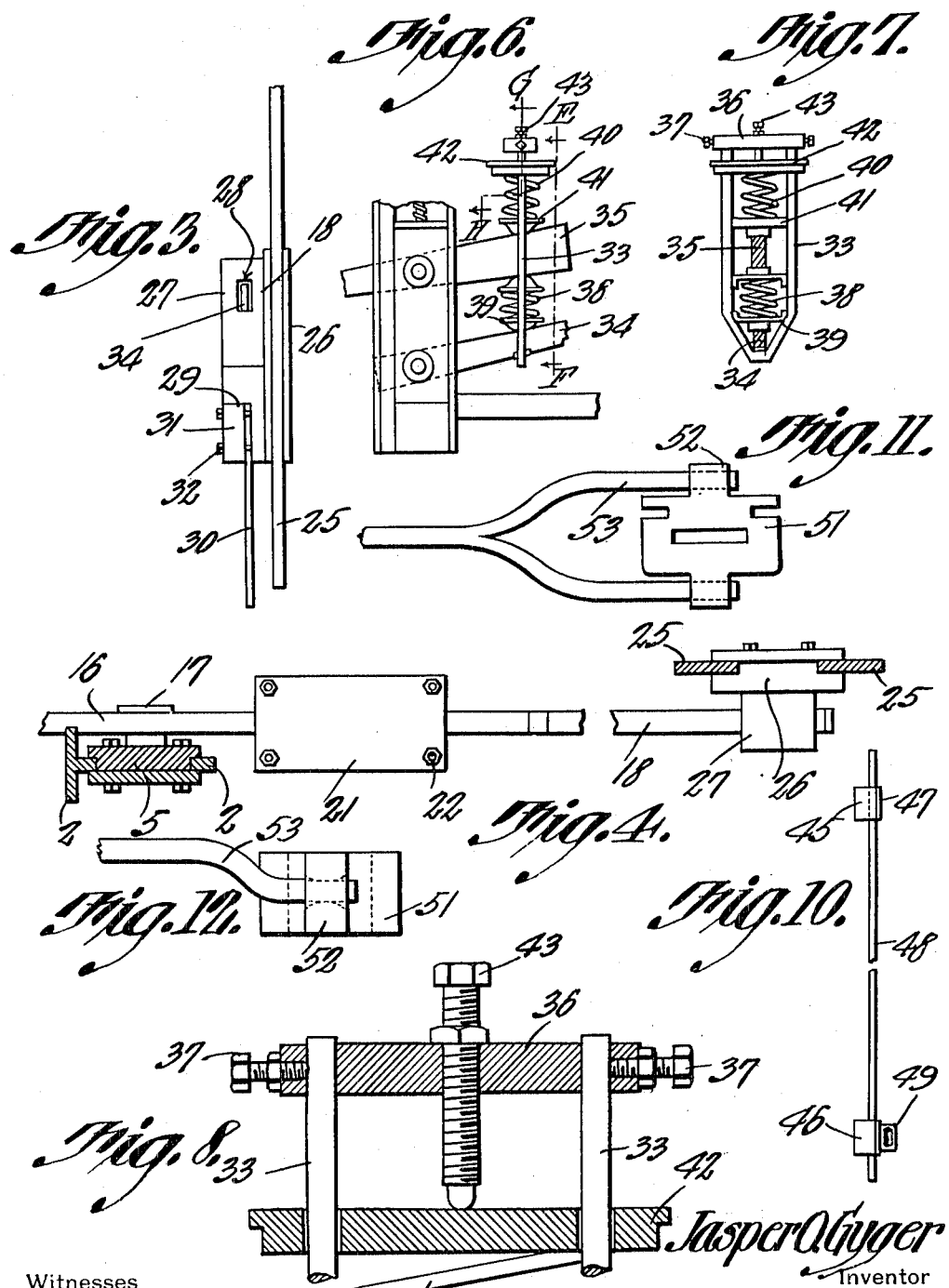

JASPER O. GYGER, OF BEDFORD, INDIANA, ASSIGNOR OF FORTY-NINE ONE-HUNDREDTHS TO EDMUND B. THORNTON, OF BEDFORD, INDIANA.

STONEWORKING-MACHINE.

1,102,190.  Specification of Letters Patent.  Patented June 30, 1914.

Application filed June 26, 1913. Serial No. 776,000.

*To all whom it may concern:*

Be it known that I, JASPER O. GYGER, a citizen of the United States, residing at Bedford, in the county of Lawrence and State of Indiana, have invented a new and useful Stoneworking-Machine, of which the following is a specification.

This invention relates to stone working machines particularly designed for channeling or cutting stone.

One of the objects of the invention is to provide a simplified structure having the cutter drills connected thereto in such a manner as to enable the machine to run continuously in chopping or cutting stone until the drill holder or clamp is brought to the surface of the stone thus eliminating the numerous adjustments which have heretofore been necessary before a stone could be cut to a depth of more than three or four inches.

A further object is to so arrange the drill holder or clamp as to support the drills directly in line with the center of force exerted thereagainst, thus greatly increasing the efficiency of the machine.

A further object is to provide a novel arrangement of drill actuating levers having adjustable fulcrums whereby the efficiency of the levers as drill actuating means is maintained the same at all times, irrespective of the depth of the cut.

Another object is to provide improved means for adjusting the tension of the springs utilized for transmitting motion to the drill holder.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine constituting the present invention. Fig. 2 is an enlarged view partly in side elevation and partly in section of the drills and their holder. Fig. 3 is an edge view of the holder and the drills therein. Fig. 4 is a section on line A—B Fig. 1. Fig. 5 is a section on line C—D Fig. 1. Fig. 6 is a side elevation of a portion of the machine and showing a slightly modified structure. Fig. 7 is a section on line E—F Fig. 6. Fig. 8 is an enlarged section on line G—H Fig. 6. Fig. 9 is a side elevation of a portion of a modified form of machine. Fig. 10 is an edge view of one of the long drills used in connection with said modified form and of the clamps combined therewith. Fig. 11 is a plan view of a portion of another modified form of machine. Fig. 12 is a side elevation of the parts shown in Fig. 11.

Referring to the figures by characters of reference 1 designates a wheel supported body and mounted on this body preferably at a point adjacent the center of the sides thereof are upstanding parallel guides 2 provided with a suitable connection 3 at their upper ends in which a screw 4 is slidably mounted. This screw is swiveled at its lower end within the upper end portion of a bearing block 5 slidably mounted between the guides. A gear 6 bears downwardly on the connection 3 and engages the screw 4, this gear being rotated in any suitable manner, as by means of a gear 7 which, in turn, can be rotated by a hand wheel 8 or the like. Thus it will be seen that by means of this mechanism, the block 5 can be raised or lowered between the guides 2.

A motor 9 of any suitable form is mounted on the structure 1 and is adapted to transmit motion through a gear 10 to another gear 11 suitably supported. A plate 12 is secured on one face of the gear and has a wrist pin 13 normally in line with the center of gear 12. This plate, however, can be shifted by inserting its fastening bolts 14 into one or more openings 14' in gear 11 so as thus to hold wrist pin 13 off center. A bearing plate 15 is carried by wrist pin 13 and when said wrist pin is off center, will be caused to travel in a circle. This plate 15 is slidably engaged by one end of a main lever 16 which is fulcrumed, as at 17, upon the adjustable block 5. A supplemental lever 18 is fulcrumed upon the block as at 19 and is overhung by the short arm of lever 16. In the structure shown in Fig. 1, toothed U-rods 20 are extended under lever 18 and across the sides of the short arm of lever 16 and are secured, at their upper ends, to a top plate 21. Nuts 22 engage the upper ends of the rods 20 and bear downwardly on plate 21 so that, by screwing these nuts onto the rods, the plate 21 can be shifted toward the lever 16. A coiled spring 23 is interposed between plate 21 and the short arm of lever 16 and another coiled spring 24 is interposed between the short arm of lever 16 and lever 18.

Connected to the structure 1 preferably at one end of the side thereof are upstanding parallel guides 25 suitably connected at their upper ends and mounted upon these guides is a slide 26 having a laterally extending portion 27 provided with a transverse opening 28, the upper and lower walls of this opening being preferably convex, as shown in Fig. 2, so as to present rounded bearings for the end of lever 18, which end projects into opening 28. The extension or enlargement 27 provides a shoulder 29 along the lower portion thereof, this shoulder constituting an abutment for the upper ends of cutting drills 30. A clamping plate 31 is adapted to hold these drills against the side of the slide 26, there being tightening screws 32 or the like for holding the drills clamped between the slide and the plate 31. These drills can be of any desired length, the distance between the slide 26 and the active ends of the drills usually being about three feet.

It is to be understood that the machine herein described is to be mounted upon a track such as shown at 33' and in operating the machine, motion is transmitted from motor 9 to gear 11 and, if plate 12 is adjusted so as to support wrist pin 13 off center, the rotation of gear 11 will result in the oscillation of the main lever 16. During the downward movement of the short arm of this lever, motion will be transmitted therefrom through spring 24 to the supplemental lever 18 and slide 26 will thus be shifted downwardly so as to drive the bits 30 against the surface being cut. During the upward movement of the short arm of lever 16, spring 23 will push against plate 21 and thus lift rods 20 and lever 18, thereby raising the bits 30. The springs 23 and 24 will thus operate to relieve the machine of excessive jarring. Furthermore as the bits 30 cut down into the stone, the fulcrum block 5 can be adjusted downwardly so that the mechanism will be just as effective when the bits are deep in the stone as when the bits are first entering the stone.

Attention is called to the fact that the opening 28 is located directly above shoulder 29 and bits 30 so that the thrust exerted by lever 18 against the slide 26 is along a line extending longitudinally of the bits. There is therefore no danger of the slide being tilted laterally out of line as would be the case should power be applied to the slide at a point to one side of the longitudinal center of the bits.

Instead of providing two rods for connecting the levers as shown in Fig. 1, a single rod 33, which is substantially U-shaped, can be extended under the supplemental lever 34 and along the sides of the short arm of main lever 35, as shown in Figs. 6 and 7, the free ends of the rod 33 being held within a top plate 36 by set screws 37. A spring 38 is interposed between blocks 39 secured to the upper edge of lever 34 and the lower edge of lever 35 respectively and another spring 40 is interposed between a block 41 which is mounted on lever 35 and a plate 42 which is adjustable upon the sides of rod 33. An adjusting screw 43 extends through the top plate 36 and by screwing the same against plate 42, the tension of the springs can be increased.

Importance is attached to the fact that by providing a structure such as described, the lower lever 18 can be made practically straight from end to end and, by utilizing the U-bolts or rods described, the tension of the springs can be varied at will so that the most effective drill possible can be produced by the use of the levers and, consequently, the stone will be more rapidly cut than would otherwise be the case. Furthermore, by arranging the drills as shown, the machine can be run continuously in chopping or cutting stone until the clamp or slide comes into contact with the stone surface. Heretofore it has been necessary to unclamp the bits and readjust them after they have been moved every two or three inches into the stone and this has required the expenditure of considerable time and labor. Obviously by eliminating this need of adjustment, the machine is rendered much more efficient.

As shown in Fig. 9 the machine may be provided with elongated guides 44 engaged by upper and lower slides 45 and 46, each of these slides including a clamping plate 47 whereby long drills or bits such as shown at 48 may be secured to the slides 45 and 46. The lower slide 46 has a projection 49 similar to the extension or enlargement heretofore described and this extension is adapted to receive the end of a lever 50 similar to the lever 18 hereinbefore referred to.

By providing a structure such as herein described it will be seen that very long bits can be used.

Instead of providing a slide such as shown, for example, in Fig. 2, a modified form of slide such as illustrated at 51 may be employed, this slide being adapted to work between guides in the same manner as the slides hereinbefore described. In this modified construction, however, the slide is provided upon each of two opposed faces with outwardly extending enlargements 52.

These enlargements receive the ends of a fork 53 formed at one end of lever 54, this lever being substituted for the levers 18 and 34 hereinbefore referred to. By utilizing a structure such as shown in Figs. 11 and 12 the force of the blow is always distributed equally to opposite sides of the slide 51, thus preventing lateral binding on the guides. This structure also permits the use of long drills in the cutting machine.

What is claimed is:—

1. A stone working machine including an adjustable bearing block, a main lever fulcrumed thereon at a point between its ends, a secondary lever fulcrumed thereon at one end, a spring interposed between said levers and bearing thereagainst, a plate above the main lever, a spring interposed between the plate and the main lever, a connection between the plate and the secondary lever for maintaining all of the springs constantly under compression, means for oscillating the main lever, a slide actuated by the secondary lever, and cutting elements carried by the slide.

2. A stone working machine including a bit carrying slide mounted for vertical reciprocation, a bearing block, means for adjusting the same vertically, a main lever fulcrumed between its ends upon the block, a supplemental lever fulcrumed at one end upon the block, a spring interposed between the main and supplemental levers, a spring mounted on the main lever, a member bearing on said last named spring, a connection between said member and the supplemental lever for holding all of the springs constantly under compression, means for adjusting the tension of the springs, said means engaging said connection, the slide being engaged by the supplemental lever.

3. In a stone working machine, the combination with a drill carrying slide mounted for reciprocation, of a bearing block mounted for adjustment along a line parallel with the path of movement of the slide, a main lever fulcrumed upon the block and having a short arm and a long arm, means engaging the long arm for oscillating the lever, a supplemental lever fulcrumed at one end upon the block, said supplemental lever engaging the slide to actuate it, a spring interposed between the short arm of the main lever and the supplemental lever, a second spring mounted upon said short arm, a member supported by said second spring, a connection between said member and the supplemental lever for holding both springs constantly under compression, and means engaging the connection for adjusting the tension of the springs.

In testimony that I claim the foregoing as my own, I have hereto affixed my signature in the presence of two witnesses.

JASPER O. GYGER.

Witnesses:
 EDMUND B. THORNTON,
 FRED W. HACKLEMAN.

Copies of this patent may be obtained for five cents each, by addressing the "Commissioner of Patents Washington, D. C."